Patented Nov. 2, 1948

2,452,928

UNITED STATES PATENT OFFICE 2,452,928

TREATMENT OF WATER

Clifford A. Hampel, Harvey, Ill., assignor to Mathieson Chemical Corporation, a corporation of Virginia No Drawing. Application May 23, 1945, Serial No. 595,489

7 Claims. (Cl. 210—28)

This invention relates to improvements in the treatment of water and more particularly to improvement in the taste and odor of the finished water, especially with respect to mal-tastes and odors such as are frequently retained in water after a chlorine treatment or are developed or accentuated as a result of a chlorine treatment of the water.

Many cities and towns depend upon river, lake and other surface water for their water supply. Practically all such water has to be treated in various ways in order to make it safe or acceptable for human consumption. Ordinarily water of this type is clarified, filtered and disinfected. The usual method of disinfecting the water to free it of bacteriological infection, or to reduce bacteriological content to a safe range prescribed by state or municipal health department, involves subjecting the water to a chlorine treatment.

Many water supplies are contaminated by industrial wastes, such as wastes containing phenol and related compounds and waste liquors from paper making operations. Other common sources of contamination are algae and other similar microorganisms, decayed vegetable matter, sewerage effluent and the like. Frequently, the presence of such contaminants in the water supply results in disagreeable tastes or odors which are not ordinarily removed by chlorination, but which, in fact, are often developed or accentuated by the conventional chlorine treatment and make the water unsatisfactory for drinking or cooking purposes even though bacteriologically safe. Many methods have been developed and are being used in attempts to correct this objection but generally they have not been found completely satisfactory due either to lack of effectiveness, excessive cost, the inability to maintain adequate control or other difficulties.

A common cause of mal-tastes and odors of water is the presence in the water supply of phenols or related compounds. When such compounds are present in the water supply, even in extremely low concentrations insufficient to render the water objectionable, the chlorination of the water to render it bacteriologically safe has been found to result in an extremely objectionable taste and odor, apparently due to a reaction of the chlorine with the phenol or phenolic contaminants resulting in the formation of chlorophenolic or like compounds with a characteristic, so-called, chlorophenolic taste and odor.

This result of chlorine treatment of certain water has long been recognized in the art of water treating but previously suggested methods of overcoming the disagreeable consequences have generally not been wholly effective.

It has heretofore been proposed to alleviate the objectionable results of the chlorine treatment of such water by materially increasing the amount of chlorine used. For instance, there has been developed a method of treating water supplies known as "break-point chlorination." By this method improved results have been obtained in some instances, but frequently only at substantial economic sacrifice. Further, this method has not always been found to be effective or dependable. One objection to the break-point method is due to the fact that the concentration of contaminants in the water is subject to wide and frequent variation; consequently, the amount of chlorine necessary for satisfactory "break point" operation is also subject to wide and frequent variation, rendering the operation a difficult one to control.

The phenomena which occur when chlorine is added to water are peculiar and not completely understood. At first, the chlorine is consumed in satisfying the "normal chlorine demand" of the water, which may be subject to wide variation, even when from the same source of water supply. As the chlorine dosage is increased beyond the demand of the particular water being treated, there develops in the water a chlorine residual. As the chlorine dosage is further increased, say from 1 part per million to 5 parts per million, the chlorine residual may increase, but, as the chlorine dosage is further increased, a maximum chlorine residual is sometimes reached and, as the chlorine dosage is increased beyond that which results in the maximum chlorine residual, there may occur a decrease in chlorine residual, sometimes the chlorine residual disappearing completely. Thereafter, as the chlorine dosage is further increased there usually occurs a rise in chlorine residual, usually in almost direct proportion to the increase in chlorine dosage. The point where this further rise occurs in the superchlorination of water is designated "break-point." The point varies with different water and if chlorine residual be plotted against chlorine dosage, it will be found that there is a considerable variation in the shape of the resultant curve for different waters.

Where this method is used, it is sometimes found that the mal-taste and odor of the water, and particularly water containing phenolic contaminants, disappears at the break-point, but with a lesser chlorine dosage, the mal-taste and odor is accentuated. Frequently, the mal-taste and odor is not eliminated, even at the breakpoint.

I have discovered that the difficulties heretofore experienced may be avoided and that improved results may be consistently obtained by subjecting the water to the action of chlorine dioxide concurrently with chlorination for disinfecting the water. For instance, while carrying on the conventional chlorine treatment for disinfecting the water, the chlorine dioxide may be introduced into the water being so treated. The chlorine and chlorine dioxide may be admixed before introduction into the water or they may be separately injected into the chlorinating zone of the system.

The treatment of water with chlorine dioxide has previously been suggested as a substitute for a chlorine treatment for the destruction of bacteria. Further, it has previously been observed that so treating a water containing phenolic compounds with chlorine dioxide does not develop or accentuate mal-tastes or odors in the water. However, it has not previously been known that mal-tastes and odors present in the water could be eliminated by a simultaneous treatment with chlorine dioxide and chlorine, or that the development or accentuation of mal-tastes and odors in the water by chlorine treatment could be prevented by the presence of chlorine dioxide during the chlorine treatment.

The optimum amount of chlorine dioxide used in accordance with my present invention, and the ratio of chlorine dioxide to chlorine used, will vary considerably, depending primarily upon the water condition. The chlorine dosage is desirably at least sufficient to disinfect the water, and to satisfy the chlorine demand of the particular water being treated, in accordance with conventional practice.

The required ratio of chlorine dioxide to chlorine to eliminate mal-tastes and odors may be influenced by the contaminant present and also by the chlorine dosage employed. For instance, where waters are primarily contaminated with phenol or related compounds the chlorine dioxide dosage required for protection against mal-tastes and odors will usually decrease as the chlorine dosage is increased beyond the normal chlorine demand of the water. The available chlorine of the chlorine dioxide appears to assist the chlorine in satisfying the chlorine demand of the water.

Where the chlorine dosage is only sufficient for disinfection of the water, the ratio of chlorine to chlorine dioxide should not usually exceed about 1:1, where complete elimination of mal-tastes and odors in the finished water is desired. Smaller proportions of chlorine dioxide may be used with advantage, but may not consistently result in completely palatable water, particularly where the $Cl_2$ and $ClO_2$ are applied to the raw water.

Where the chlorine dosage exceeds that required only for disinfection of the water, as in superchlorination, the ratio of $ClO_2$ to chlorine, required for taste and odor correction, usually decreases with an increase in chlorine dosage, as previously noted. This ratio may be 1:10 or even much lower depending upon the nature and concentration of the contaminants in the water, the degree to which superchlorination is carried and the treatment to which the water is subjected prior to the dosing with $Cl_2$ and $ClO_2$.

It will be understood that all reference herein and in the accompanying claims to the amounts or proportions of chlorine or chlorine dioxide used or contained in the water is expressed in terms of the weight of available chlorine. Elemental chlorine, for instance liquid or gaseous chlorine, is, of course, 100% available chlorine. The available chlorine equivalent of chlorine dioxide is 263%.

The invention is applicable both to the pre-treatment or post-treatment of the water, i. e., prior to or subsequent to the filtration of the water, respectively. In conventional practice, the water is usually chlorinated prior to filtration, and operation in accordance with my present invention does not interfere with such conventional procedure. In such operation, it is usually desirable to use a sufficient dosage of available chlorine to maintain a chlorine residual of say about 0.1 to about 0.3 part per million after the water has passed through the filter.

The chlorine dioxide, as such, may be introduced into the main stream of water being treated in admixture with the chlorine, as previously noted, or it may be generated by known means in a relatively small portion of water, for instance, by reacting a water-soluble chlorite, for instance, sodium or calcium chlorite, with chlorine or with an acid, and the water having the chlorine dioxide dissolved therein, introduced into the water being treated in the zone of chlorination. Accordingly, the expression "contacting the water with chlorine dioxide," appearing in the claims, must be understood to include the introduction of chlorine dioxide as such into the water as well as the generation or development of chlorine dioxide in the water.

An advantageous method of treating the water with a mixture of chlorine and chlorine dioxide is to react the predetermined dosage of chlorine gas and an aqueous solution of a chlorite, separately injected at a metered rate into a small flow of water, and to inject the resultant mixture into the main water supply. The generation of chlorine dioxide will be rapid and complete, inasmuch as the proportion of chlorine in the zone of reaction exceeds the amount normally required to satisfy the reaction.

When the chlorine dioxide is generated by reacting chlorine with a chlorite apart from the main dosage of chlorine, it is desirable to use an amount of chlorine for this purpose in excess of that theoretically required to react with the chlorite so as to induce rapid and complete conversion of the chlorite. The theoretical requirement is one mole of chlorine for each two moles of chlorine dioxide liberated.

It will be understood that the invention is independent of the particular method by which the chlorine dioxide is generated. Any other method of generating chlorine dioxide may be used, for instance the reaction of an acid with a chlorate.

The effectiveness of my improved method of treating water, in removing and preventing the development or accentuation of mal-tastes and odors by chlorination, is demonstrated and my invention is further illustrated by the following examples of its application.

*Example I*

The raw water of a municipal water supply in the Great Lakes area, pumping 1.3 million gallons per day, was treated at the intake of the pump with a mixture of chlorine dioxide and chlorine, said mixture being obtained by reacting sodium chlorite with chlorine water discharged from conventional chlorinating equipment. The chlorine was dispensed at the rate of six pounds per day and the chlorite at the rate equivalent to 3.9 pounds of available chlorine per day. This operation was equivalent to a dosage of 0.44 P. P. M. chlorine dioxide and 0.45 P. P. M. chlorine. This simultaneous treatment of the raw water with chlorine and chlorine dioxide corrected an objectionable taste and odor condition due to the presence of phenolic compounds, which the previously used conventional method of prechlorination, consisting of dosing the raw water at the same point with sufficient chlorine to disinfect the water supply, failed to remove. In both cases alum was added with the disinfectants, and the water was then clarified by passing through pressure filter.

*Example II*

A municipal water supply in the southeastern area of the United States, pumping about a million gallons per day, had a taste and odor due to algae, which could not be corrected by any of the conventional methods normally used. This taste and odor condition was corrected by substituting a mixture of chlorine dioxide and chlorine for the post-chlorination normally used. The operation was regulated so as to dose the water with 0.5 P. P. M. chlorine dioxide and 0.65 P. P. M. chlorine. In both operations the pretreatment consisted only of flocculation and settling.

*Example III*

A sample of raw river water was dosed with 17 P. P. M. alum, settled for two hours and then filtered. The water so treated, when dosed with 5 P. P. M. chlorine, developed a distinct chlorphenolic taste and odor. Separate samples of this water, which had been treated with alum and settled, were treated with chlorine and chlorine dioxide simultaneously in a series of tests. In each of these tests, the proportion of chlorine used was 5 parts per million. The proportion of chlorine dioxide used in the respective tests was varied in small increments from 0.5 to 5 parts per million. In the test where 0.5 P. P. M. of chlorine dioxide was used, the finished water had a very slight taste and odor, but where the proportion of chlorine dioxide used was increased to 1 P. P. M. or higher, no objectionable taste or odor could be detected in the finished water.

It will be understood that with different waters, the minimum requirement of chlorine dioxide for complete avoidance of mal-taste and odor will vary and may be readily determined by simple tests.

*Example IV*

In a series of similar tests using other portions of the same water used in Example III, the chlorine dosage was reduced to 3 P. P. M. and the proportion of chlorine dioxide was varied. In this particular water where the proportion of chlorine dioxide used was 1 and 1.5 P. P. M., respectively, the finished water had a slight taste and odor, but where the proportion of chlorine dioxide was further increased, for instance to 3 P. P. M., no disagreeable taste or odor was detectable.

Where the chlorine dioxide was omitted, a decidedly disagreeable taste and odor developed.

The optimum dosage of chlorine and chlorine dioxide used in the treatment of water contaminated with phenol or the like, in accordance with this invention, will, as previously noted, depend to a considerable extent upon the condition of the water. In general, increased concentrations of phenolic compounds, or similar odoriferous contaminants, in the water require an increased proportion of chlorine dioxide completely to eliminate the mal-taste and odor. The chlorine dosage may be determined in conventional manner.

Reference has been made herein to the treatment of water contaminated by phenols or related compounds which react with chlorine to form chlorophenols or the like. It will be understood, however, that reference herein and in the claims to phenolic compounds is intended to include not only phenols but also related compounds, for instance cresols, xylenols and the like. The invention is useful generally in removing from water mal-tastes and odors, due to the presence of contaminants of the types previously noted, and in preventing the development thereof by the chlorination of such contaminated water.

During certain seasons, surface water will frequently be contaminated by algae which contribute to objectionable tastes and odors of the water, some of which tastes and odors are normally accentuated by the conventional chlorine treatment. By treating such water in accordance with my present invention, the inherent tastes and odors due to algae and other similar microorganisms, or the development or accentuation of such objectionable tastes and odors by the usual chlorine treatment, may be prevented or minimized. It will be understood that reference to algae in the appended claims is intended to include, in addition to algae, other similar microorganisms.

Though similar mal-tastes and odors in the finished water may sometimes be minimized or prevented by break-point chlorination, without the use of chlorine dioxide, there is a tendency for them to develop on long standing. A further advantage of the present invention is that in water treated in accordance therewith, any such tendency is substantially eliminated or at least minimized.

It will be understood that the present invention is applicable generally to the treatment of water with chlorine dioxide and chlorine simultaneously whether or not the chlorine is supplied in elemental form. Accordingly, the "addition" of chlorine to the water, as recited in the claims, must be understood to include the treatment of water by chlorination whether the chlorine is supplied in elemental form or in combined form as by the conventional addition of a hypochlorite to the water.

In each instance, amounts of residual available chlorine given herein are as determined by the standard Ortho-Tolidine Test.

I claim:

1. In the disinfecting of water by chlorination, the improvement which comprises improving the taste and odor of the resultant water by concurrently adding to the water chlorine in amount at least sufficient to disinfect the water to render it potable and chlorine dioxide in amount such that the ratio of dissolved chlorine to dissolved chlorine dioxide is within the range of about 1:1 to about 10:1.

2. In the chlorination of water contaminated by the presence of a material which reacts with chlorine to develop and accentuate mal-tastes and mal-odors in the finished water, the improvement which comprises improving the taste and odor of the resultant water by concurrently adding to the water chlorine in amount at least sufficient to disinfect the water to render it potable and chlorine dioxide in amount such that the ratio of dissolved chlorine to dissolved chlorine dioxide is within the range of about 1:1 to about 10:1.

3. In the chlorination of water contaminated by the presence of phenolic compounds, the improvement which comprises improving the taste and odor of the resultant water by concurrently adding to the water chlorine in amount at least sufficient to disinfect the water to render it potable and chlorine dioxide in amount such that the ratio of dissolved chlorine to dissolved chlorine dioxide is within the range of about 1:1 to about 10:1.

4. In the chlorination of water from a raw water source containing algae, the improvement which comprises improving the taste and odor of the resultant water by concurrently adding to the water chlorine in amount at least sufficient to disinfect the water to render it potable and chlorine dioxide in amount such that the ratio of dissolved chlorine to dissolved chlorine dioxide is within the range of about 1:1 to about 10:1.

5. In the chlorination of water, the improvement which comprises improving the taste and odor of the resultant water by concurrently adding to the water chlorine in amount sufficient to effect superchlorination and render the water potable and chlorine dioxide in amount such that the ratio of dissolved chlorine to dissolved chlorine dioxide is within the range of about 1:1 to about 10:1.

6. In the chlorination of water contaminated by the presence of a material which reacts with chlorine to develop and accentuate mal-tastes and mal-odors in the finished water, the improvement which comprises improving the taste and odor of the resultant water by concurrently adding to the water chlorine in amount sufficient to effect superchlorination and render the water potable and chlorine dioxide in amount such that the ratio of dissolved chlorine to dissolved chlorine dioxide is within the range of about 1:1 to about 10:1.

7. In the disinfecting of water by chlorination, the improvement which comprises improving the taste and odor of the resultant water by concurrently adding chlorine and chlorine dioxide to the water, the amount of chlorine dissolved in the water being sufficient to effect superchlorination and render the water potable and the amount of chlorine dioxide dissolved in the water ranging between an amount about equal to and an amount about one-tenth of the amount of chlorine required substantially to disinfect the water.

CLIFFORD A. HAMPEL.

REFERENCES CITED

The following references are of record in the file of this patent:

UNITED STATES PATENTS

| Number | Name | Date |
|---|---|---|
| 1,197,640 | Kriegsheim | Sept. 12, 1916 |
| 1,229,305 | Menzies | June 12, 1917 |
| 1,324,118 | Hottinger et al. | Dec. 9, 1919 |
| 1,750,561 | Adler | Mar. 11, 1930 |
| 1,866,524 | Baker | July 12, 1932 |

FOREIGN PATENTS

| Number | Country | Date |
|---|---|---|
| 3,529 | Great Britain | 1913 |
| 4,917 | Great Britain | 1898 |
| 19,722 | Great Britain | 1914 |
| 22,048 | Great Britain | 1914 |